(12) United States Patent
Tomita

(10) Patent No.: US 9,420,125 B2
(45) Date of Patent: Aug. 16, 2016

(54) INFORMATION PROCESSING APPARATUS AND CONTROL METHOD OF THE INFORMATION PROCESSING APPARATUS

(75) Inventor: Makoto Tomita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 12/722,191

(22) Filed: Mar. 11, 2010

(65) Prior Publication Data

US 2010/0231969 A1   Sep. 16, 2010

(30) Foreign Application Priority Data

Mar. 12, 2009   (JP) .................... 2009-060127

(51) Int. Cl.
*G06F 3/12* (2006.01)
*H04N 1/00* (2006.01)

(52) U.S. Cl.
CPC ....... *H04N 1/00244* (2013.01); *H04N 1/00933* (2013.01); *H04N 2201/0012* (2013.01)

(58) Field of Classification Search
None
See application file for complete search history.

(56) References Cited

U.S. PATENT DOCUMENTS

| 7,243,126 | B2 * | 7/2007 | Sasaki et al. | 709/206 |
| 7,412,602 | B2 * | 8/2008 | Park et al. | 713/182 |
| 2003/0221122 | A1 | 11/2003 | Hatori | |
| 2006/0176500 | A1 * | 8/2006 | Hosoi et al. | 358/1.14 |
| 2008/0062471 | A1 * | 3/2008 | Matsuda | 358/402 |

FOREIGN PATENT DOCUMENTS

| JP | 2000-267922 | | 9/2000 |
| JP | 2003-316650 | | 11/2003 |
| JP | 2008-152363 | A | 7/2008 |
| JP | 2008152363 | A * | 7/2008 |

\* cited by examiner

*Primary Examiner* — Marivelisse Santiago Cordero
*Assistant Examiner* — Neil R McLean
(74) *Attorney, Agent, or Firm* — Canon USA Inc. IP Division

(57) ABSTRACT

The present invention is directed to an information processing apparatus in which a waiting time for waiting image data in the information processing apparatus can be adjusted, as much as possible, to a time period during which the image data read by the image reading apparatus is acquired by the information processing apparatus through a file sharing system.

When the apparatus determines that an image reading setting which matches a setting registration name set to the PC by a user according to a registration operation of the image reading setting is applied, the PC changes the sharing condition of the shared file folder to an open state. Then, when the apparatus determines that the image reading setting is no longer applied or the image is not currently read, the PC changes the sharing condition of the shared file folder to a private state.

7 Claims, 12 Drawing Sheets

FIG. 5

| REGISTERING DESTINATION DEVICE | MULTIFUNCTIONAL COPYING MACHINE B | ← 501 |
| --- | --- | --- |
| DEVICE LOG-IN ID | 1000 | ← 502 |
| DEVICE LOG-IN PASSWORD | **** | ← 503 |
| BUTTON NAME | TRANSMIT TO PC-A | ← 504 |
| TRANSMISSION FOLDER | AA | ← 505 |
| SENDING DESTINATION ID | user | ← 506 |
| SENDING DESTINATION PASSWORD | **** | ← 507 |

OK 508    CANCEL 509

| IMAGE READING SETTING DATA | | |
|---|---|---|
| BUTTON ID | 001 | 601 |
| DEVICE LOG-IN ID | 1000 | 602 |
| BUTTON NAME | TRANSMIT TO PC-A | 603 |
| SENDING DESTINATION | 192.168.0.1 | 604 |
| DESTINATION FOLDER | AA | 605 |
| SENDING DESTINATION USER ID | user | 606 |
| SENDING DESTINATION PASSWORD | pass | 607 |

INFORMATION PROCESSING APPARATUS AND CONTROL METHOD OF THE INFORMATION PROCESSING APPARATUS

BACKGROUND OF THE INVENTION

1. Field of the Invention

The present invention relates to an information processing apparatus, a control method of the information processing apparatus and a computer program for the information processing apparatus. More specifically, the present invention relates to those which are suitable to be used in a the information processing apparatus which acquires an image data created by an image forming apparatus through a file sharing system.

2. Description of the Related Art

When a transmission of data is performed between information processing apparatus (hereinafter referred to as the "PC" or "PCs") which are connected to a network, a typically used is a file sharing protocol which is termed a server message block (SMB). In the file sharing system, a file stored within one's PC is placed in a state that the other PCs can access the file through a network and a plurality of users of the PCs can share the file through the network.

When a scanner or a multifunctional copying machine is used to read image data and thus read image data is stored in the PC, the file sharing system is also utilized. However, in this system, a PC of a data receiving side is required to wait for a connection from a PC of a data transmission source side, so that the file is frequently subjected to an unauthorized access. Namely, there is concern about security in the above system.

In view of the above, Japanese Patent Laid-open Publication No. 2000-267922 discusses a method of determining in advance a start time and an end time of data waiting in the PC of the data receiving side.

Alternatively, Japanese Patent Laid-open Publication No. 2003-316650 discusses another method of placing the PC of the data receiving side in a state of waiting for the data only when the PC of the data receiving side is connected to the network which is recognized as a safety network.

SUMMARY OF THE INVENTION

The present invention is directed to an information processing apparatus in which a waiting time of image data in the information processing apparatus can be adjusted, as much as possible, to a time period during which the information processing apparatus acquires the image data read by an image reading apparatus through a file sharing system.

According to an aspect of the present invention, an information processing apparatus connected by a network to an image reading apparatus which reads image data includes a storage unit configured to acquire the image data read by the image reading apparatus from the image reading apparatus and to store thus acquired image data in a storage area, a detection unit configured to detect a progress situation of processing in the image reading apparatus for reading the image data or an operation situation by a user with respect to the information processing apparatus and a control unit configured to control the information stored in the storage area to switch the information between an open state and a private state with respect to the external devices according to the detection result of the detection unit.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a graphical user interface (GUI) for an image reading setting according to the first exemplary embodiment.

FIG. 6 schematically illustrates an example of image reading setting data to be transmitted from the PC to and stored in the device according to the first exemplary embodiment.

DESCRIPTION OF THE EMBODIMENTS

Various exemplary embodiments, features, and aspects of the invention will be described in detail below with reference to the drawings.

In devices according to the conventional technique, a solution of common problems in the file sharing system is proposed, which narrows a possibility of unauthorized accesses.

An operation of reading the image data with an image reading apparatus such as a scanner or a multifunctional copying machine and storing the image data in a personal computer (PC) is performed only when a user himself of the PC operates the image forming apparatus.

However, in the conventional technique, there is concern that the image reading apparatus can be placed in a waiting state in cases other than the above, so that, when the waiting state matches the standby condition, the image reading apparatus is frequently subjected to an unauthorized access. Therefore, the problem of security would not be resolved. For example, in the technique discussed in the above Japanese Patent Laid-open No. 2000-267922, the problem of the security would not be resolved depending on a time zone during which the access is allowed.

Therefore, the present invention is directed to an information processing apparatus in which a waiting time of image data in an information processing apparatus can be adjusted, as much as possible, to a time period during which the information processing apparatus acquires the image data read by the image reading apparatus through a file sharing system.

Figure 1:
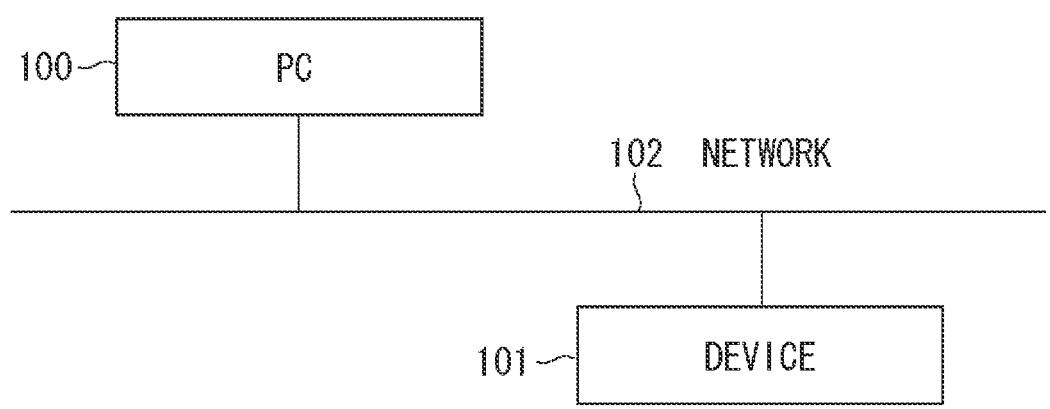
FIG. 1 illustrates an example of a structure of an image reading system according to a first exemplary embodiment.

A first exemplary embodiment of the present invention is described below with reference to drawings attached hereto. FIG. 1 illustrates an example of a structure of an image reading system. In FIG. 1, a PC 100 as an example of the information processing apparatus is connected to a device 101 as an example of the image reading apparatus to each other through a network 102. Specific examples of the device 101 include a network scanner and a multifunctional copying machine.

Figure 2:
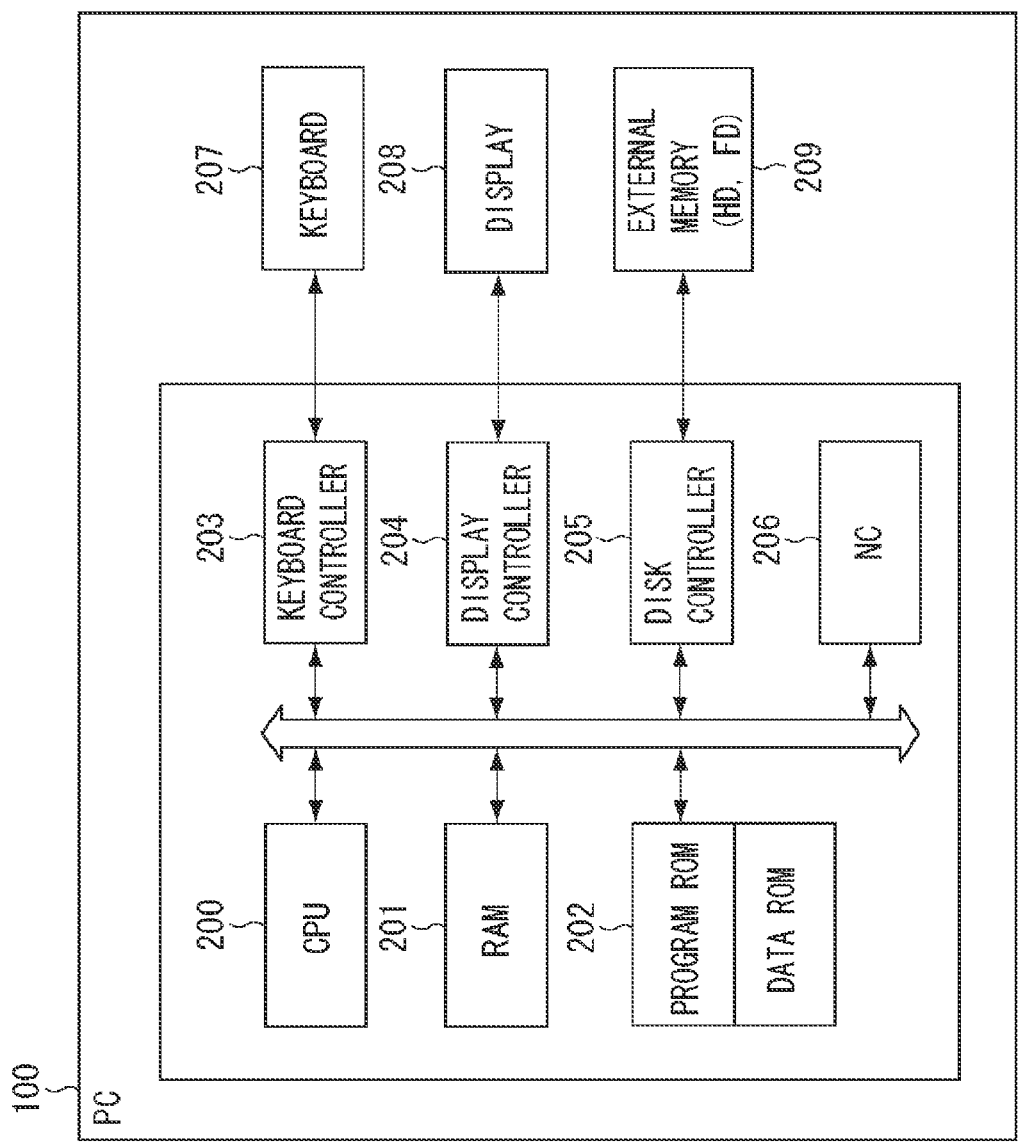
FIG. 2 illustrates an example of a structure of hardware of a personal computer (PC) according to the first exemplary embodiment.

FIG. 2 illustrates an example of a structure of hardware of the PC 100. The structural diagram of the hardware of FIG. 2 corresponds to the structural diagram of hardware of a typical information processing apparatus, and thus the structure of the hardware of the typical information processing apparatus is applicable to the PC 100 of the present exemplary embodiment.

In FIG. 2, a central processing unit (CPU) 200 executes a program stored in a program read only memory (ROM) of a ROM 202 or a program, such as an operating system (OS) or an application, loaded to a random access memory (RAM) 201 from an external memory 209. The OS is executed on a computer and the operating system is referred to as the OS below. Processing in the below described each flow chart can be realized by executing the above program.

The RAM 201 works as a main memory of the CPU 200, a work area or the like. A keyboard controller 203 controls a key input from a keyboard 207 or a not-shown pointing device. A display controller 204 controls a display of a display 208. A disk controller 205 controls a data access to a hard disk (HD) 209, a floppy disk (FD) or the like, each of which stores various data. A network controller (NC) 206 is connected to a network 102 to execute communication control processing with the other devices which are also connected to the network 102.

Figure 3:
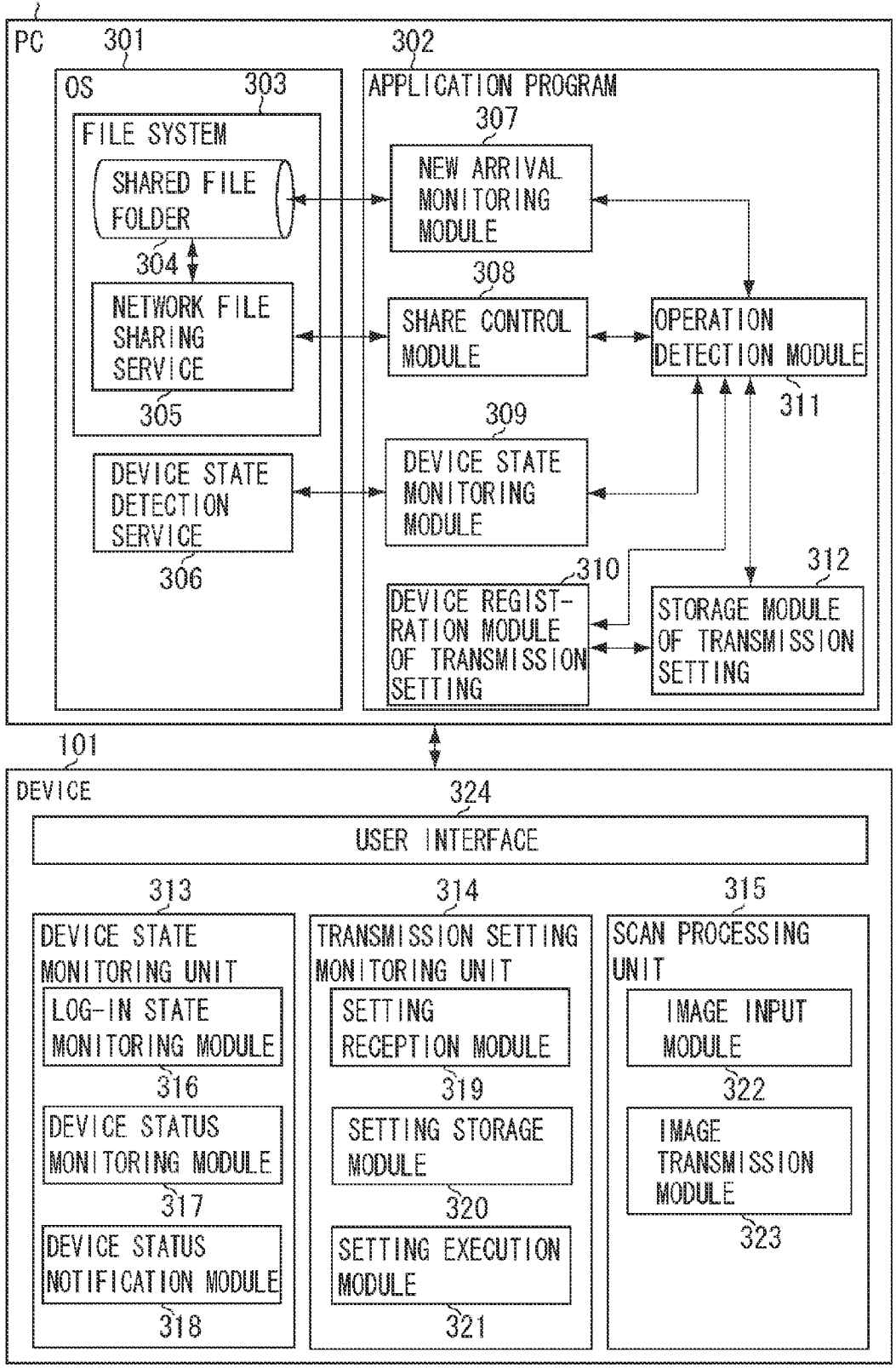
FIG. 3 schematically illustrates an example of a structure of software of an operation system (OS) and an application program executed by the PC and an example of a structure of software executed by a device according to the first exemplary embodiment.

FIG. 3 schematically illustrates an example of a structure of the OS 301 and software of an application program 302 which are executed by the PC 100 and an example of a structure of software which is executed by the device 101.

In FIG. 3, the OS 301 and the application program 302 run on the PC 100. In FIG. 3, only one application program 302 is illustrated; however, a plurality of application programs may run on the PC 100 in addition to the application program 302. Also, the PC 100 is connected to the device 101 through the network 102 and thus can exchange data and acquire status of the data.

Figure 4:
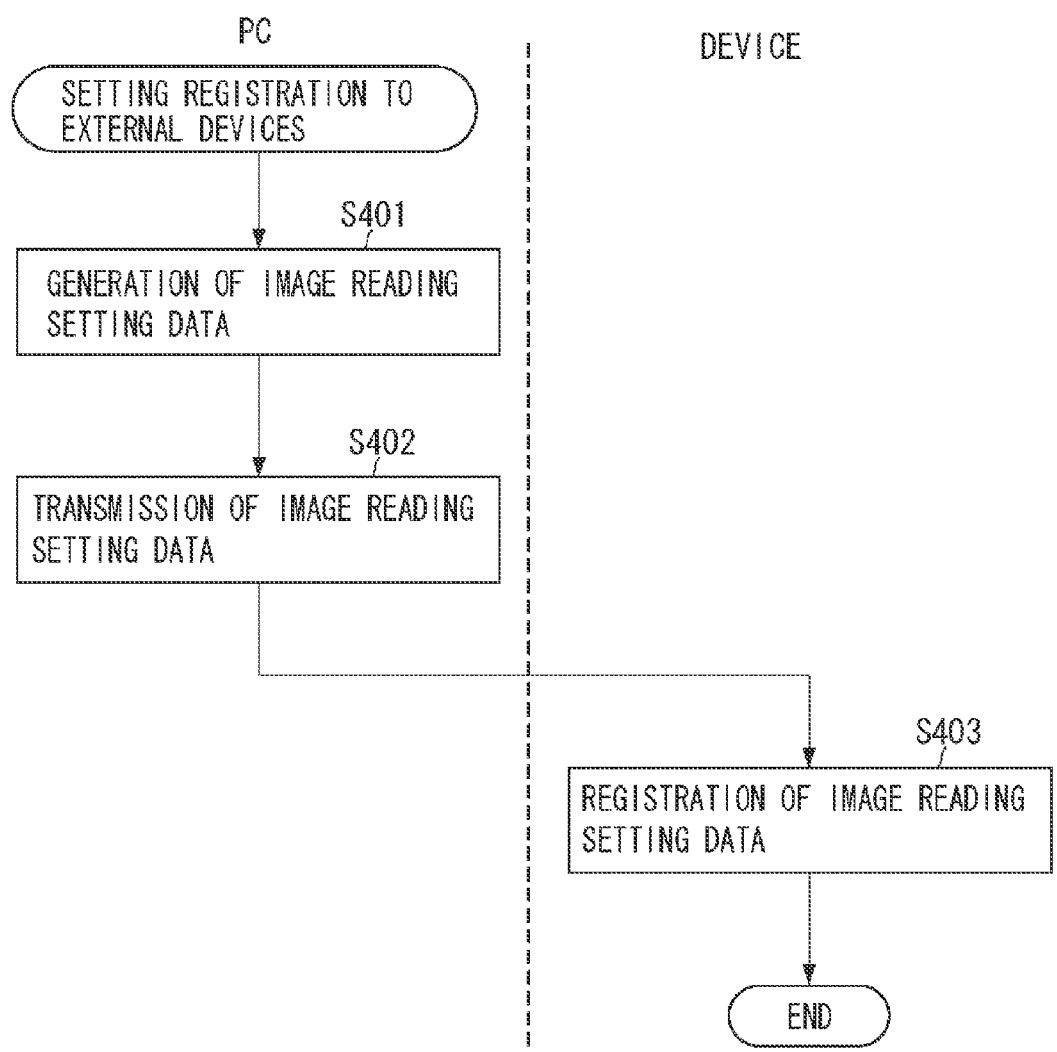
FIG. 4 is a flow chart illustrating an example of processing in an image reading system when the image reading system reads image data according to the first exemplary embodiment.

When image data is read by the device 101, the device 101 initially registers an image reading setting based on an operation by a user. FIG. 4 is a flow chart illustrating an example of processing in the image reading system when the image reading system reads the image data.

The user starts a registration operation of the image reading setting by operating the keyboard 207 of the PC 100 or a not-shown pointing device. Then, the application program 302 displays on the display 208 an input GUI for the image reading setting (hereinafter referred to as the "image reading setting GUI"). FIG. 5 illustrates an example of the image reading setting GUI.

The user inputs to an image reading setting GUI 500 of FIG. 5 a registering destination device 501, a log-in ID to the device (i.e., a device log-in ID) 502 and a device log-in password 503. Further, the user inputs the following information as information to be displayed on a user interface 324 of the device 101. In other words, the user inputs a setting registration name (i.e., a button name 504) for the image reading setting, a folder (i.e., a transmission folder 505) of the PC 100 in which the image data read by the device 101 is stored, a user ID (i.e., a destination user ID) of the PC 100 and a destination password 507. When the user clicks an OK button 508, a content input into the image reading setting GUI 500 becomes effective. On the other hand, when the user clicks a cancel button 509, the content input into the image reading setting GUI 500 is cancelled (i.e., becomes invalid).

A storage module 312 for the transmission setting in FIG. 3 stores the setting input into the image reading setting GUI 500, in an external memory 209 or the like such that the setting can be used repeatedly. In the present exemplary embodiment, for example, the storage module 312 stores the setting input into the image reading setting GUI 500, so that an example of an identifier storage unit can be realized.

In step S401, a device registration module 310 of the transmission setting creates image reading setting data according to the setting input into the image reading setting GUI 500.

In step S402, the device registration module 310 of the transmission setting transmits the image reading setting data to the device 101 shown in the registering destination device 501 through a network controller (NC) 206 and the network 102. In the present exemplary embodiment, for example, the processing of step S402 is performed to realize an example of an output unit.

A setting reception module 319 of the device 101 shown in the registering destination device 501 receives the image reading setting data transmitted from the PC 100 in step S402. Then, in step S403, a setting storage module 320 stores the image reading setting data in an external memory or the like within the device 101.

FIG. 6 schematically illustrates an example of image reading setting data to be transmitted and stored in the device 101 from the PC 100.

The PC 100, which is a transmission source of image reading setting data 600, sets itself as a sending destination 604 of the image reading setting data 600 and transmits the image reading stetting data 600.

When a setting reception module 319 receives the image reading setting data, a setting storage module 320 assigns a button ID 601 which indicates an order to be displayed on the device 101. Then, the setting storage module 320 assigns the content according to the image reading setting data having been received as items other than the button ID 601. Accordingly, the image reading setting data 600 is stored in the device 101.

When the user operates a user interface 324 of the device 101 to input the device log-in ID and the device log-in password, a log-in state management module 316 within a device status management unit 313 performs recognition processing of the user. Subsequently, the log-in state management module 316 refers to the stored image reading setting data 600 and displays a setting which matches to the input device log-in ID on the user interface 324.

Figure 7:
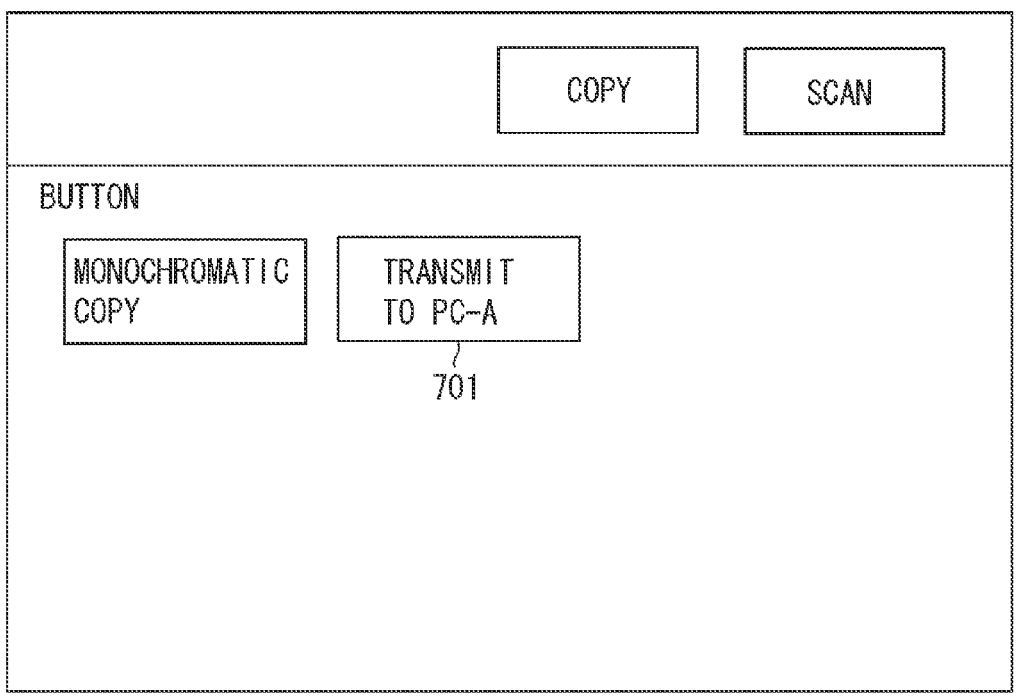
FIG. 7 illustrates an example of the GUI which is displayed on a user interface of a device when a user logs in to the device according to the first exemplary embodiment.

FIG. 7 illustrates an example of the GUI displayed on the user interface 324 of the device 101 when the user logs in to the device 101.

In the example of FIG. 7, the setting registered in the device 101 according to the setting exemplified in FIG. 6 is displayed in the form of a button 701. When the user selects the button 701, the device 101 go into a state of an image reading setting. Thus, a setting execution module 321 within a transmission setting management unit 314 employs the stored setting (i.e., the image reading setting data 600) as a current setting of the device 101. Then, the user sets a document to be subjected to the reading processing of the image to the device 101 and instructs execution of scanning processing through the user interface 324. Accordingly, an image input module 322 within a scan processing unit 315 generates image data of the document. Subsequently, an image transmission module 323 creates and transmits an image file according to the current setting of the device 101.

Figure 8:
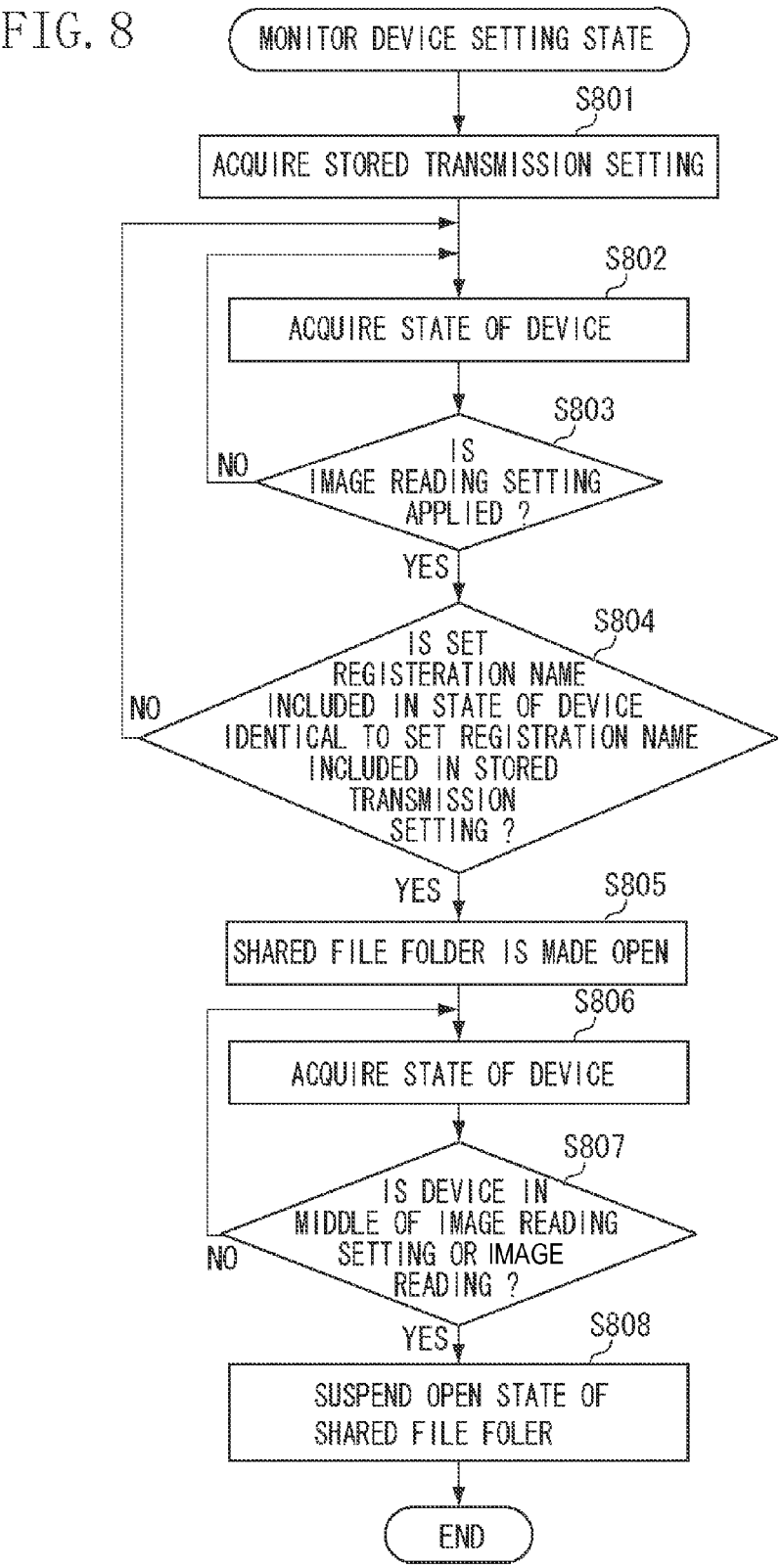
FIG. 8 is a flow chart illustrating an example of processing of the image reading system when the image reading system controls an open state of a shared file folder on the PC according to the first exemplary embodiment.

Now, while referring to a flow chart of FIG. 8, an example of processing of the image reading system when the image reading system controls an open state of the shared file folder 304 on the PC 100 is described below.

In step S801, the application program 302 acquires the transmission setting (i.e., a content of the setting input into the image reading setting GUI 500) stored by the storage module 312 of the transmission setting according to the above described processing.

Then, in step S802, the device state monitoring module 309 acquires a state of the device 101 by using a device state detection service 306 of the OS 301. The state of the device 101 is managed by a device status management module 317 within the device status management unit 313 and notified to the PC 100 by the device status notification module 318. For example, when the device 101 is in a state of the image data reading setting, the device state monitoring module 309 acquires a content of the image reading setting data 600 from the device 101.

As described above, in the present exemplary embodiment, the above described processing of step S802 realizes an example of an acquirement unit.

In step S803, the operation detection module 311 of the application program 302 determines whether or not the image reading setting is currently applied to the device 101 based on the state of the device 101 acquired in step S802. As a result of the determination, if it is determined that the image reading setting is not currently applied to the device 101 (NO in step 803), the processing returns to step S802.

On the other hand, if it is determined that the image reading setting is currently applied to the device 101 (YES in step S803), the processing goes to step S804. Then, the operation detection module 311 compares a setting registration name for the image reading setting contained in the transmission setting stored in the PC 100 (i.e., the content of the setting input into the image reading setting GUI 500) with a setting registration name for the image reading setting currently applied to the device 101. In step S804, the operation detection module 311 determines whether or not an image reading setting identical to the stored transmission setting is applied to the device 101, based on the above comparison result. As a result of the determination, if the image reading setting identical to the stored transmission setting is not applied to the device 101 (NO in step S804), the processing returns to step S802.

As described above, in the present exemplary embodiment, the processing of the step S804 realizes an example of a detection unit.

On the other hand, if the image reading setting identical to the stored transmission setting is applied to the device 101 (YES in step S804), the processing goes to step S805. The operation detection module 311 instructs the network file sharing service 305 of the OS 301 to change a sharing condition of the shared file folder 304 to "open" through a conjugated control module 308. Accordingly, in step S805, the network file sharing service 305 changes the sharing condition of the shared file folder 304 to "open". As described above, since the sharing condition of the shared file folder 304 is opened, the network file sharing service 305 can receive image data from the device 101, so that thus received image data can be stored in the shared file folder 304 as an example of a storage area.

As described above, in the present exemplary embodiment, the processing of step S805 realizes an example of a switch control by a control unit. Also, for example, the network file sharing service 305 receives the image data from the device 101 to store the image data in the shared file folder 304 which is an example of the storage area, thereby realizing an example of a storage unit.

In step S806, the device state monitoring module 309 sequentially acquires the state of the device 101. In step S807, the operation detection module 311, then, determines whether the state of the device 101 is in the image reading setting or in the image reading, based on the state of the device 101 acquired in step S806. As a result of this determination, if it is determined that the state of the device 101 is in the middle of image reading setting or in the middle of image reading (YES in step S807), the processing returns to step S806 to maintain the sharing condition of the shared file folder 304 in a state of "open".

On the other hand, if it is determined that the state of the device 101 is not either in the image reading setting or in the image reading (NO in step S807), the processing goes to step S808, recognizing that the reading of the image is paused or completed. Then, the operation detection module 311 instructs the network file sharing service 305 of the OS 301 to change the sharing condition of the shared file folder 304 to "private" through the conjugated control module 308. Accordingly, in step S808, the network file sharing service 305 changes the sharing condition of the shared file folder 304 to "private".

As described above, in the present exemplary embodiment, the processing of step S808 realizes an example of the switch control by a control unit. Further, for example, processing of steps S804 and S808 detect progress of the processing in the device 101 for reading the image data.

As described above, in the present exemplary embodiment, if it is determined that the device 101 is currently in a state of the image reading setting corresponding to the setting registration name which was set by the user to the PC 100 according to the user's registration operation of the image reading setting, the PC 100 changes the sharing condition of the shared file folder 304 to "open". Then, if it is determined that the device 101 is no longer in a state that the image reading setting is not applied or a state that the image reading is not currently performed, the PC changes the sharing condition of the shared file folder 304 to "private". Therefore, it becomes possible to change the sharing condition of the shared file folder 304 to "open" so as to coincide, as much as possible, with the time period (more preferably, limited only to the time period) during which the read image data is transmitted to the PC 100 after the device 101 started the reading operation.

Also, a waiting time of the file sharing in the PC 100 during the transfer of the image data from the device 101 can be shortened compared with the conventional technique.

In FIG. 3, a new arrival monitoring module 307 is used in a below described second exemplary embodiment, so that the module 307 is not required in the present exemplary embodiment.

A first modification is described below. In the flow chart of FIG. 8, a case of changing the sharing condition of the shared file folder 304, based on a comparison result between the name of the image reading setting included in the state of the device 101 and the name of the transmission setting stored in the PC 100, was described as an example. However, depending on abilities of the device 101 and the device state detection service 306, the state of the device 101 that the PC 100 can acquire may be limited. In such a case, for example, the sharing condition of the shared file folder 304 can be changed based on the logging-in state of the user to the device 101.

Figure 9:
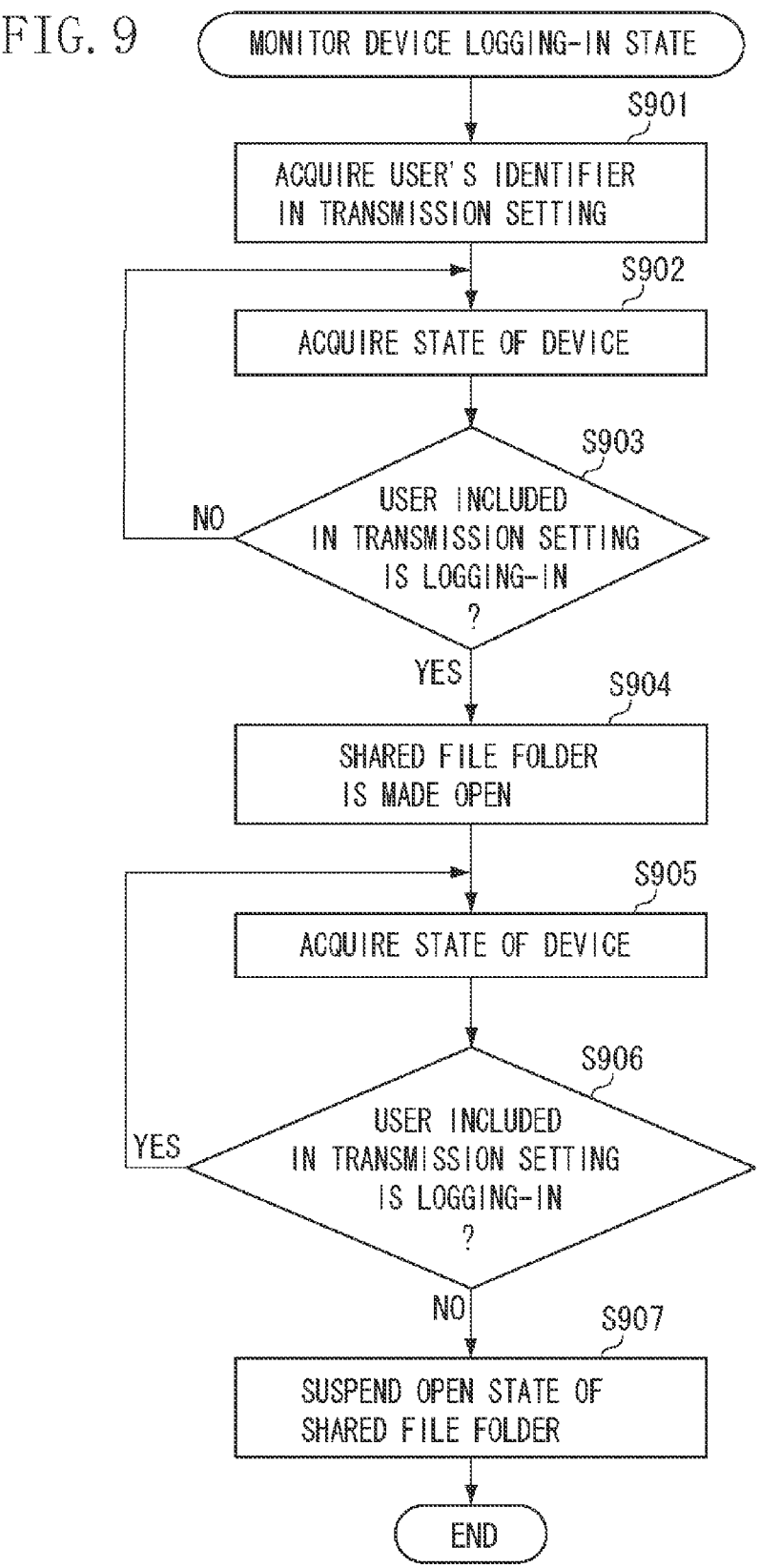
FIG. 9 is a flow chart illustrating an example of processing of the image reading system when the image reading system controls the open state of the shared file folder on the PC based on a log-in state of the user with respect to the device according to a first modification of the first exemplary embodiment.

An example of the processing of the image reading system when the image reading system controls the opened state of the shared file folder 304 on the PC 100 is described below based on the logging-in state of the user to the device 101 with reference to a flow chart of FIG. 9.

In step S901, the application program 302 acquires an identifier of the user (i.e., the device log-in ID 502) from the transmission setting stored in the storage module 312 of the transmission setting according to the above described processing.

Subsequently, in step S902, the device state monitoring module 309 uses the device state detection service 306 of the OS 301 to acquire the state of the device 101.

As described above, in the present exemplary embodiment, the processing of step S902 realizes an example of an acquirement unit.

The operation detection module 311 of the application program 302 extracts the logging-in state of the user to the device 101 based on the state of the device acquired in step S902. Then, the operation detection module 311 determines whether or not the device log-in ID identified from the extracted log-in state is identical to the device log-in ID 502 acquired in step S901. In other words, in step S903, the operation detection module 311 determines whether or not the user who matches the user of the device log-in ID 502 acquired in step S901 is currently logging-in to the device 101. As a result of the determination, if it is determined that the user, who matches the user of the device log-in ID 502 acquired in step S901, is not logging-in to the device 101 (NO in step S903), the processing returns to step S902.

As described above, in the present exemplary embodiment, the processing of step S903 realizes an example of a detection unit.

On the other hand, if the user identical to the user of the device log-in ID 502 acquired in step S901 is logging-in to the device 101 (YES in step S903), the processing goes to step S904. Then, the operation detection module 311 instructs the network file sharing service 305 of the OS 301 to change the sharing condition of the shared file folder 304 to "open" through the conjugated control module 308. Accordingly, in step S904, the network file sharing service 305 changes the sharing condition of the shared file folder 304 to "open". As described above, when the sharing condition of the shared file folder 304 is made "open", the network file sharing service 305 can receive the image data from the device 101 to store the image data in the shared file folder 304.

As described above, in the present exemplary embodiment, the processing of step S904 realizes an example of the switch control by a control unit. Further, the network file sharing service 305 receives the image data from the device 101 to store the image data in the shared file folder 304 as an example of a storage area, thereby realizing an example of a storage unit.

In step S905, the device state monitoring module 309 continues to acquire the state of the device 101.

As described above, in the present exemplary embodiment, the processing of step S905 realizes an example of an acquisition unit.

In step S906, the operation detection module 311 determines whether or not the user identical to the user of the device log-in ID 502 obtained in step S901 is logging-in to the device 101, based on the state of the device 101 acquired in step S905. As a result of the determination, if it is determined that the user identical to the user of the device log-in ID 502 acquired in step S901 is in a state of logging-in to the device 101 (Yes in step S906), the processing returns to step S905 and maintains the sharing condition of the shared file folder 304 in the state of "open".

As described above, in the present exemplary embodiment, the processing of step S906 realizes an example of a detection unit. Further, the processing of steps S903 and S906 enables detection of the progress of the processing for reading the image data in the device 101.

On the other hand, if the user identical to the user of the device log-in ID 502 acquired in step S901 is not in a state of logging-in to the device 101 but in a state of logging-out from the device 101 (NO in step S906), the processing goes to step S907. Then, the operation detection module 311 instructs the network file sharing service 305 of the OS 301 to change the sharing condition of the shared file folder 304 to "private" through the conjugated control module 308. Accordingly, in step S907, the network file sharing service 305 changes the sharing condition of the shared file folder 304 to "private".

As described above, in the present exemplary embodiment, the processing of step S907 realizes an example of a control unit.

An example of a second modification is described below. In contrast to the first modification, there is a case that the more detailed state of the device 101 can be acquired depending on the abilities of the device 101 and the device state detection service 306. In this case, for example, when the PC 100 detects the state that the user sets the document to be read, to the device 101, the sharing condition of the shared file folder 304 can be changed to "open". Then, when the PC 100 detects the state that the user removes the document to be read, from the device 101, the sharing condition of the shared file folder 304 can be changed to "private".

Now, the second exemplary embodiment of the present invention is described below. In the above described first exemplary embodiment, the sharing condition of the shared file folder 304 is changed based on the result of the comparison between the state of the device 101 and the transmission setting stored in the PC 100. However, there is a case that the state of the device cannot be acquired depending on the abilities of the device 101 and the device state detection service 306. In the present exemplary embodiment, a case is described in which a sharing condition of the shared file folder 304 is changed based on an operation state of the PC 100 by the user. As described above, the present exemplary embodiment differs from the first exemplary embodiment in a determination method when the sharing condition of the shared file folder 304 is changed. On the other hand, a system structure, a hardware structure and a software structure of the present exemplary embodiment are identical to those of the first exemplary embodiment (see FIGS. 1 through 3; however, the new arrival monitoring module 307 of FIG. 3 is added to the present exemplary embodiment). Therefore, in the description of the present exemplary embodiment, portions different from those in the above described first exemplary embodiment are denoted by the same numbers and/or symbols which are used in FIG. 1 through 9 and therefore detailed description of the portions are omitted.

An example of the processing of the image reading system when the image reading system controls the opened state of the shared file folder 304 on the PC 100 is described below with reference to a flow chart of FIG. 10.

In step 1001, the application program 302 of the PC 100 performs the image reading setting based on the registration operation of the image reading setting by the user and registers the image reading setting data in the device 101 through the NC 206 and the network 102. The processing of step S1001 can be realized by, for example, the one identical to the processing of FIG. 4.

In step S1002, the operation detection module 311 of the application program 302 acquires the operation state of the PC 100 performed by the user.

In step S1003, the operation detection module 311 determines whether or not the user is continuing the operation of the PC 100. If it is determined that the user is continuing the operation of the PC 100 (YES in step S1003), the processing returns to step S1002.

On the other hand, if it is determined that the user is not continuing the operation of the PC 100 (NO in step S1003), the processing goes to step S1004. In step S1004, the operation detection module 311 determines whether or not the user stops the operation of the PC 100 for the predetermined time period. If the operation detection module 311 determines that no operation has been performed by the user with respect to the PC 100 for the predetermined time period (NO in step S1004), the processing returns to step S1002.

As described above, in the present exemplary embodiment, the processing of step S1004 realizes an example of a detection unit.

On the other hand, if the operation detection module 311 determines that no operation of the PC 100 has been performed by the user for the predetermined time period (YES in step S1004), the processing goes to step S1005. Then, the operation detection module 311 instructs the network file sharing service 305 of the OS 301 to change the sharing condition of the shared file folder 304 to "open" through the conjugated control module 308. Accordingly, in step S1005, the network file sharing service 305 changes the sharing condition of the shared file folder 304 to "open". If the user performs an end operation of the application program 302 itself and thereby the processing of the application program 302 is ended, no processing is considered to have been performed with respect to the application program 302 (for the predetermined time period). Subsequently, the sharing condition of the shared file folder 304 is changed to "open".

As described above, in the present exemplary embodiment, the processing of step S1005 realizes an example of a switch control by a control unit.

Then, in step S1006, the new arrival monitoring module 307 of the application program 302 monitors the shared file folder 304 on the file system 303 of the PC 100.

Subsequently, in step S1007, the new arrival monitoring module 307 determines whether or not an image file (i.e., a newly arrived file) is created within the shared file folder 304. If it is determined that no image file is created in the shared file folder 304 (NO in step S1007), the processing returns to step S1006.

As described above, in the present exemplary embodiment, by the creation of the image file (i.e., the newly arrived file) within the shared file folder 304 as the storage area, an example of a storage unit is realized.

On the other hand, if it is determined that an image file is created in the shared file folder 304 (YES in step S1007), the processing goes to step S1008. In step S1008, the application program 302, then, displays a GUI notifying a newly arrived read image on the display 208. The GUI indicating a newly arrived read image notifies the user that the image data acquired by reading a document, which the user sets on the device 101, is captured in the shared file folder 304 of the PC 100.

In step S1009, the operation detection module 311 subsequently acquires the operation state of the PC 100 performed by the user. Then, in step S1010, the operation detection module 311 determines whether or not the user performed any operation, such as a display or a movement of a newly arrived file, with respect to the newly arrived file. If the operation detection module 311 determines that the user has not made any operation with respect to the newly arrived file (NO in step S1010), the processing returns to step S1006.

As described above, in the present exemplary embodiment, the processing of step S1009 realizes an example of a detection unit.

On the other hand, if the operation detection module 311 determines that the user has made some operation with respect to the newly arrived file (YES in step S1010), the processing goes to step S1011. Then, the operation detection module 311 instructs the network file sharing service 305 of the OS 301 to change the sharing condition of the shared file folder 304 to "private" through the conjugated control module 308. Accordingly, in step S1011, the network file sharing service 305 changes the sharing condition of the shared file folder 304 to "private".

As described above, in the present exemplary embodiment, the processing of step S1011 realizes an example of a switch control by a control unit.

Then, the device registration module 310 of the transmission setting instructs the device 101, as the registering destination device 501 input into the image reading setting GUI 500, to delete a target image reading setting data 600, through the NC 206 and the network 102. Accordingly, in step S1012, the device 101 deletes the image reading setting data 600.

Figure 10:
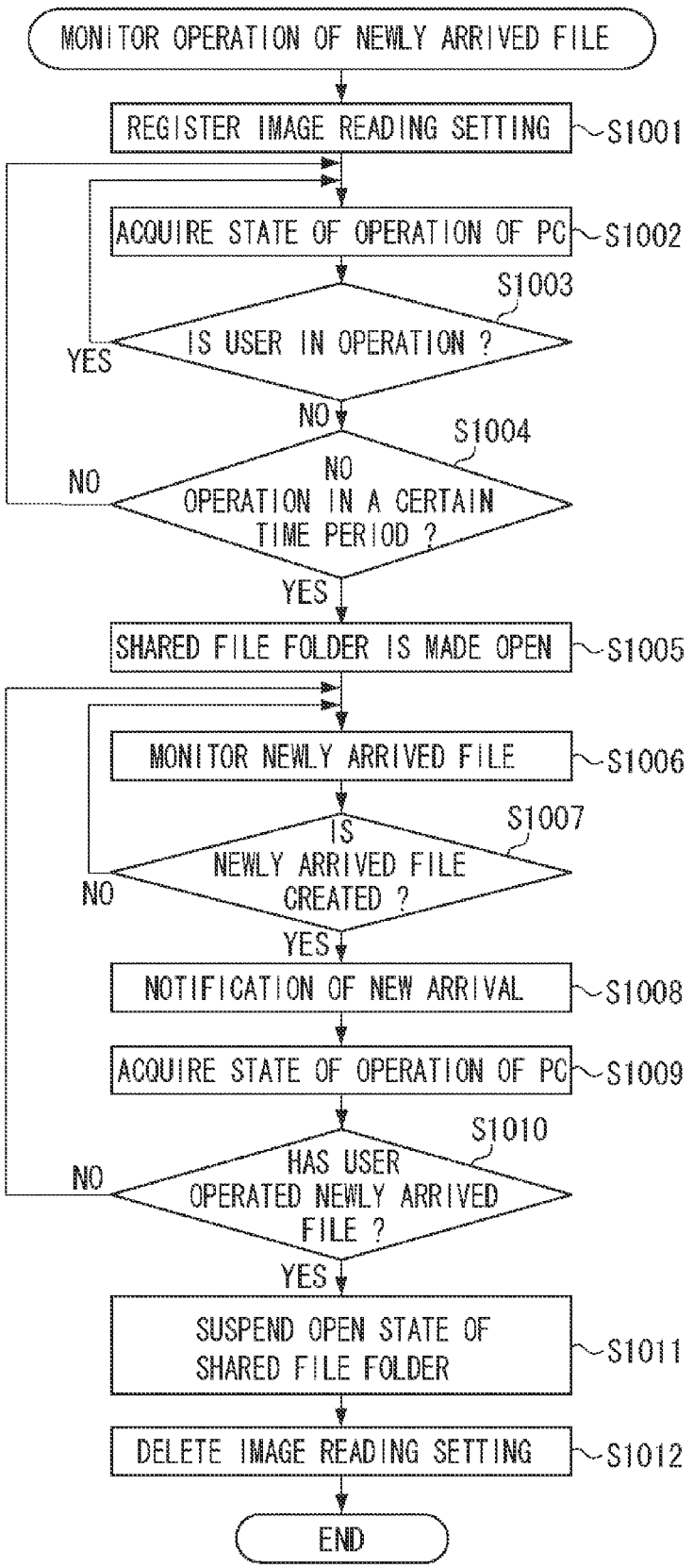
FIG. 10 is a flow chart illustrating an example of processing of the image reading system when the image reading system controls the open state of the shared file folder on the PC according to a second exemplary embodiment.
Figure 11:
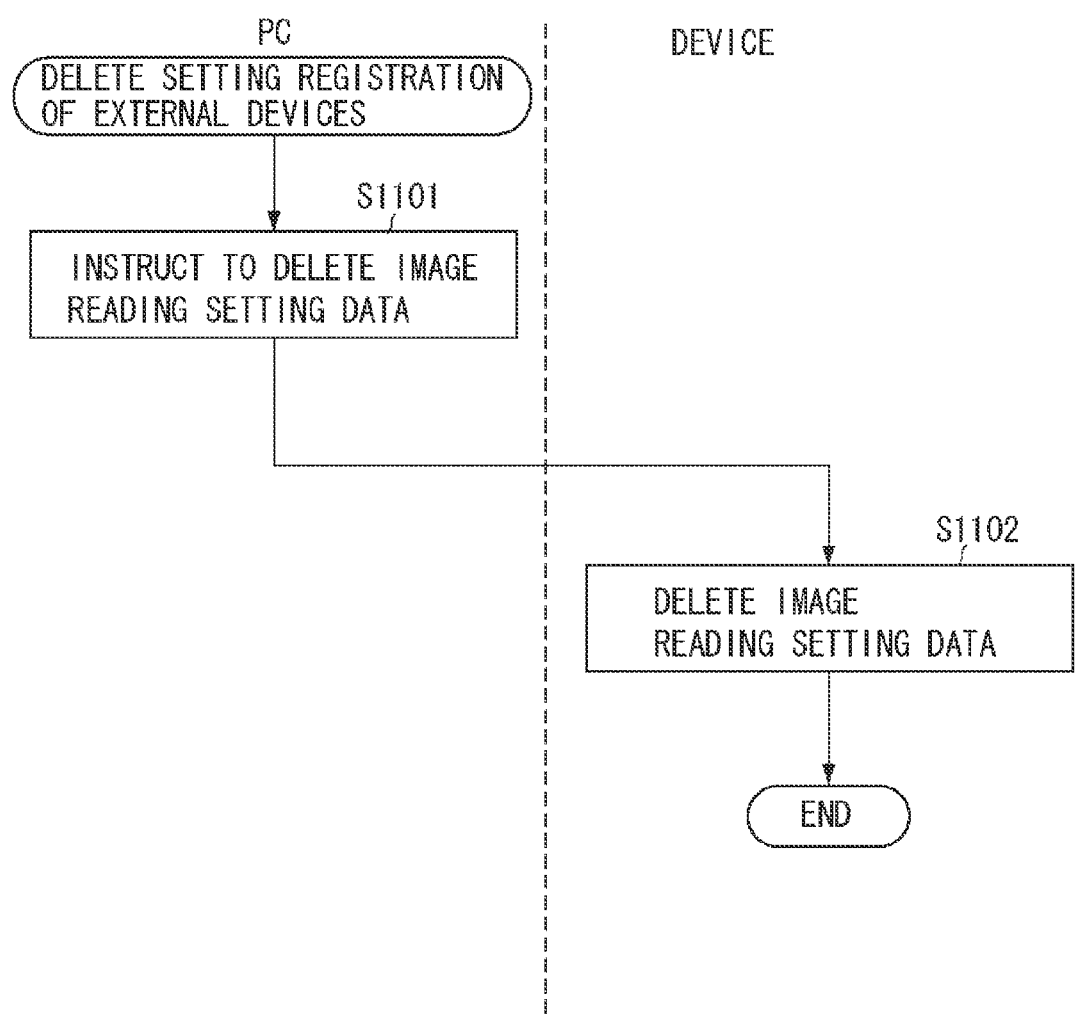
FIG. 11 is a flow chart illustrating in detail an example of processing of step S1012 of FIG. 10 (processing when image reading setting data is deleted) according to the second exemplary embodiment.

FIG. 11 is a flow chart illustrating in detail an example of the processing of step S1012 of FIG. 10 (i.e., the processing of deleting the image reading setting data 600).

In FIG. 11, the device registration module 310 of the transmission setting of the application program 302 acquires a setting registration name input in the button name 504 from the image reading setting stored in the storage module 312 for storing the transmission setting. Then, in step S1101, the device registration module 310 of the transmission setting transmits a setting deletion notification which designates thus acquired setting registration name to the device 101 shown in the registering destination device 501 through the NC 206 and the network 102.

As described above, in the present exemplary embodiment, the processing of step S1101 realizes an example of a request unit.

The setting reception module 319 within the transmission setting management unit 314 of the device 101 as shown in the registering destination device 501 receives the setting deletion notification transmitted in step S1101. Then, in step S1102, the setting storage module 320 deletes the image reading setting data 600 stored in the device 101.

As described above, in the present exemplary embodiment, if it is determined that no operation has been performed by the user for the predetermined time period with respect to the PC 100 after the image reading setting data 600 is registered in the device 101, the PC 100 changes the sharing condition of the shared file folder 304 to "open". Subsequently, if it is determined that an operation is performed by the user with respect to an image file newly created in the shared file folder 304, the PC 100 changes the sharing condition of the shared file folder 304 to "private". Then, the PC 100 deletes the image reading setting data 600 of the device 101.

Consequently, even when the PC 100 cannot acquire the state of the device 101 due to the abilities of the device 101 and the device state determination service 306, an effect similar to the effect produced by the above described first exemplary embodiment can be produced. In other words, after the device 101 starts the image reading operation, the device 101 can change the sharing condition of the shared file folder 304 to "open", which is adjusted, as much as possible, to the time period during which the device 101 transfers thus read image data to the PC 100.

A modification of the present exemplary embodiment is described below. In the flow chart of FIG. 10, as an example, the registration or the deletion of the image reading setting data 600 is performed with respect to the device 101 at the beginning or at the end of the image reading operation. However, there may be a case that the device 101 cannot store the image reading setting data 600 depending on a function of the device 101. In such a case, the sharing condition of the shared file folder 304 can be changed based only on the operation state of the PC 100 by the user.

Figure 12:
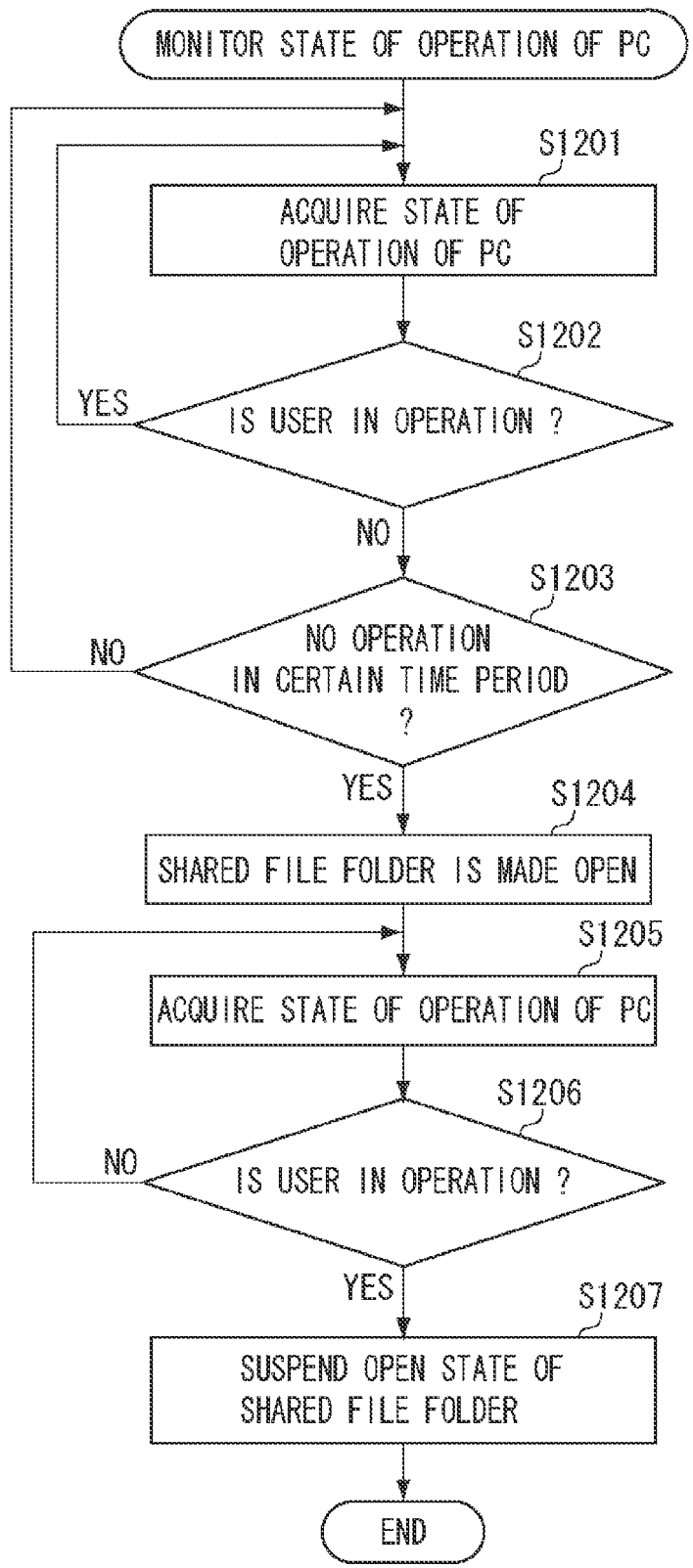
FIG. 12 is a flow chart illustrating an example of processing of the image reading system when the image reading system controls the open state of the shared file folder on the PC based on only an operation state of the PC by the user according to a modification of the second exemplary embodiment.

An example of the process of the image reading system will be described when the image reading system controls the open state of the shared file folder 304 on the PC 100 based only on the operation state of the PC 100 performed by the user with reference to a flow chart of FIG. 12.

In step S1201, the operation detection module 311 of the application program 302 acquires the operation state of the PC 100 performed by the user.

In step S1202, the operation detection module 311 determines whether or not the user is continuing the operation of the PC 100. If it is determined that the user is continuing the operation of the PC 100 (YES in step S1202), the processing returns to step S1201.

On the other hand, if it is determined that the user is not continuing the operation of the PC 100 (NO in step S1202), the processing goes to step S1203. Then, in step S1203, the operation detection module 311 determines whether or not the operation of the PC 100 by the user has not been performed for the predetermined time period. If the operation detection module 311 determines that the operation of the PC 100 by the user has been continuously performed for the predetermined time period (NO in step S1203), the processing returns to step S1201.

As described above, in the present exemplary embodiment, the processing of the step S1203 realizes an example of a detection unit.

On the other hand, if the operation detection module 311 determines that the operation of the PC 100 by the user has not been performed for the predetermined time period (NO in step S1206), the processing goes to step S1204. Then, the operation detection module 311 instructs the network file sharing service 305 of the OS 301 to change the sharing condition of the shared file folder 304 to "open" through the conjugated control module 308. Accordingly, in step S1204, the network file sharing service 305 changes the sharing condition of the shared file folder 304 to "open". As described above, the sharing condition of the shared file folder 304 is made "open". As a result, the network file sharing service 305 can receive the image data from the device 101 to store thus received image data in the shared file folder 304.

As described above, in the present exemplary embodiment, the processing of step S1204 realizes an example of a switch control by a control unit. Further, an example of the storage unit can be realized by the network file sharing service 305 receiving the image data from the device 101 to store thus received image data in the shared file folder 304 serving as a storage area.

In step S1205, the operation detection module 311 of the application program 302 acquires the operation state of the PC 100 performed by the user. Then, in step S1206, the operation detection module 311 determines whether or not there was the operation of the PC 100 by the user. In this step S1206, in addition to a method for determining whether or not there was any operation by the user with respect to the PC 100, it may be determined whether or not the user made the operation with respect to the newly arrived file of the shared file folder 304, similar to step S1010 of FIG. 10.

As described above, in the present exemplary embodiment, the processing of step S1206 realizes an example of a detection unit.

As a result of the determination of step S1206, if it is determined that there is no operation of the PC 100 performed by the user (NO in step S1206), the processing returns to step S1205. On the other hand, if it is determined that there was the operation of the PC 100 by the user, the processing goes to step S1207. Then, the operation detection module 311 instructs the network file sharing service 305 of the OS 301 to change the sharing condition of the shared file folder 304 to "private" through the conjugated control module 308. Accordingly, in step S1207, the network file sharing service 305 changes the sharing condition of the shared file folder 304 to "private".

As described above, in the present exemplary embodiment, the processing of step S1207 realizes an example of a control unit.

Each of the above described exemplary embodiments shows mere examples in carrying out the present invention, and thus the technical scope of the present invention should not be unduly restricted in interpretation of the present invention. More specifically, the present invention can be carried out in various ways without departing from the spirit of the invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060127 filed Mar. 12, 2009, which is hereby incorporated by reference herein in its entirety.

What is claimed is:

1. An information processing apparatus connected by a network to an image reading apparatus which reads image data, the information processing apparatus comprising:
   an acquisition unit configured to acquire a state of the image reading apparatus from the image reading apparatus via the network;
   a detection unit configured to determine, based on the state of the image reading apparatus acquired from the image reading apparatus by the acquisition unit, whether or not a pre-stored image reading setting is currently applied to the image reading apparatus, wherein the pre-stored image reading setting indicates a shared folder of the information processing apparatus as a transmission destination; and
   a control unit configured to automatically change a sharing condition of the shared folder of the information processing apparatus to an open state when the detection unit determines that the pre-stored image reading setting is currently applied to the image reading apparatus, and configured to automatically change the sharing condition of the shared folder of the information processing apparatus to a private state when the detection unit determines that the pre-stored image reading setting is not currently applied to the image reading apparatus,
   wherein, when the control unit determines that the state of the image reading apparatus is in the middle of an image reading setting or in the middle of image reading, the sharing condition of the shared folder of the information processing apparatus remains in the open state.

2. The information processing apparatus according to claim 1, further comprising:
   a registration unit configured to create the pre-stored image reading setting, and to transmit the created image reading setting to the image reading apparatus, wherein the image reading apparatus stores the transmitted image reading setting.

3. An information processing apparatus connected by a network to an image reading apparatus which reads image data, the information processing apparatus comprising:
   an acquisition unit configured to acquire a state of the image reading apparatus from the image reading apparatus via the network;
   a detection unit configured to determine, based on the state of the image reading apparatus acquired from the image reading apparatus by the acquisition unit, whether or not a log-in user who logs in to the image reading apparatus is identical to a user information included in a pre-stored image reading setting, wherein the pre-stored image reading setting indicates a shared folder of the information processing apparatus as a transmission destination; and
   a control unit configured to automatically change a sharing condition of the shared folder of the information processing apparatus to open state when the detection unit determines that the log-in user is identical to the user information included in the pre-stored image reading setting, and configured to automatically change the sharing condition of the shared folder of the information processing apparatus to a private state when the detection unit determines that the log-in user is not identical to the user information included in the pre-stored image reading setting,
   wherein, when the control unit determines that the state of the image reading apparatus is in the middle of an image reading setting or in the middle of image reading, the sharing condition of the shared folder of the information processing apparatus remains in the open state.

4. A control method of an information processing apparatus which is connected to the image reading apparatus for reading image data to each other through a network, the control method comprising the steps of:
   acquiring a state of the image reading apparatus from the image reading apparatus via the network;
   determining, based on the state of the image reading apparatus acquired from the image reading apparatus in the acquiring step, whether or not a pre-stored image reading setting is currently applied to the image reading apparatus, wherein the pre-stored image reading setting indicates a shared folder of the information processing apparatus as a transmission destination;
   controlling to automatically change a sharing condition of the shared folder of the information processing apparatus to an open state when it is determined in the determining step that the pre-stored image reading setting is currently applied to the image reading apparatus; and
   controlling to automatically change the sharing condition of the shared folder of the information processing apparatus to a private state when it is determined in the determining step that the pre-stored image reading setting is not currently applied to the image reading apparatus,
   controlling, the sharing condition of the shared folder of the image processing apparatus to remain in the open state when it is determined that the state of the image reading apparatus is in the middle of an image reading setting or in the middle of image reading.

5. A non-transitory computer readable storage medium which stores a program for causing a computer to execute the control method according to claim 4.

6. A control method of an information processing apparatus which is connected to the image reading apparatus for reading image data to each other through a network, the control method comprising the steps of:
   acquiring a state of the image reading apparatus from the image reading apparatus via the network;
   determining, based on the state of the image reading apparatus acquired from the image reading apparatus in the acquisition step, whether or not a log-in user who logs in to the image reading apparatus is identical to a user information included in a pre-stored image reading setting, wherein the pre-stored image reading setting indicates a shared folder of the information processing apparatus as a transmission destination;
   controlling to automatically change a sharing condition of the shared folder of the information processing apparatus to open state when it is determined in the determining step that the log-in user is identical to the user information included in the pre-stored image reading setting, and
   controlling to automatically change the sharing condition of the shared folder of the information processing apparatus to a private state when it is determined in the determining step that the log-in user is not identical to the user information included in the pre-stored image reading setting,
   controlling, the sharing condition of the shared folder of the image processing apparatus to remain in the open state when it is determined that the state of the image reading apparatus is in the middle of an image reading setting or in the middle of image reading.

7. A non-transitory computer readable storage medium which stores a program for causing a computer to execute the control method according to claim 6.

\* \* \* \* \*